US009786030B1

(12) United States Patent
Binder et al.

(10) Patent No.: US 9,786,030 B1
(45) Date of Patent: Oct. 10, 2017

(54) PROVIDING FOCAL LENGTH ADJUSTMENTS

(71) Applicant: Google Inc., Mountain View, CA (US)

(72) Inventors: Thomas Binder, Lübeck (DE); Martin Christopher Böhme, Lübeck (DE)

(73) Assignee: Google Inc., Mountain View, CA (US)

( * ) Notice: Subject to any disclaimer, the term of this patent is extended or adjusted under 35 U.S.C. 154(b) by 267 days.

(21) Appl. No.: 14/305,449

(22) Filed: Jun. 16, 2014

(51) Int. Cl.
*G06T 3/00* (2006.01)
*G06K 9/00* (2006.01)

(52) U.S. Cl.
CPC ........ *G06T 3/0093* (2013.01); *G06K 9/00228* (2013.01)

(58) Field of Classification Search
None
See application file for complete search history.

(56) References Cited

U.S. PATENT DOCUMENTS

| | | | |
|---|---|---|---|
| 7,014,323 B2 | 3/2006 | Kobayashi et al. | |
| 8,599,238 B2 | 12/2013 | Wu et al. | |
| 2005/0147292 A1* | 7/2005 | Huang | G06K 9/00228 382/159 |
| 2006/0210148 A1* | 9/2006 | Nakashima | G06K 9/00208 382/154 |
| 2008/0259085 A1* | 10/2008 | Chen | G06T 13/205 345/473 |
| 2012/0027269 A1* | 2/2012 | Fidaleo | G06Q 30/0268 382/118 |
| 2012/0306875 A1* | 12/2012 | Cai | G06T 9/001 345/420 |
| 2014/0043329 A1* | 2/2014 | Wang | G06T 17/20 345/420 |
| 2014/0085514 A1* | 3/2014 | Lin | H04N 5/2628 348/241 |
| 2014/0184748 A1* | 7/2014 | Gharib | H04N 13/0246 348/46 |

OTHER PUBLICATIONS

Luis Unzueta, et al., "Efficient Generic Face Model Fitting to Images and Videos", Image and Vision Computing, Jan. 13, 2014, pp. 01-36.
Pamela M. Pallett, et al., "New "Golden" Ratios for Facial Beauty", Vision Res. Jan. 25, 2010; 50(2): 149.doi:10.1016/j.visres.2009.11. 003.
Tommer Leyvand, et al., "Data-Driven Enhancement of Facial Attractiveness", ACM Trans. Graph. 27, 3, Article 38 (Aug. 2008), 9 pages. DOI: https://doi.org/10.1145/1360612.1360637, 2008, 9 pp.

* cited by examiner

*Primary Examiner* — Vu Nguyen
(74) *Attorney, Agent, or Firm* — IP Spring

(57) ABSTRACT

Implementations generally relate to providing focal length adjustments in photos. In some implementations, a method includes determining a face model of a face in a photo. The method further includes simulating a change in the focal length based on the face model.

18 Claims, 4 Drawing Sheets

300

PROVIDING FOCAL LENGTH ADJUSTMENTS

BACKGROUND

The popularity and convenience of digital cameras as well as the widespread of use of Internet communications have caused user-produced images such as photographs to become ubiquitous. Image editing systems for various consumer electronic devices and personal computers enable a user to manipulate images. Such image editing systems typically require the user to understand complicated and difficult instructions to manipulate the image. This level of knowledge places advanced editing features out of the grasp of the average user.

SUMMARY

Implementations generally relate to providing focal length adjustments in photos. In some implementations, a method includes determining a face model of a face in a photo. The method further includes simulating a change in the focal length based on the face model.

With further regard to the method, in some implementations, the face model includes face landmarks. In some implementations, the method further includes determining head pose information. In some implementations, the simulating of the change in the focal length includes parametrized face warping. In some implementations, the simulating of the change in the focal length includes parametrized face warping, and the parametrized face warping includes changing a size of one or more facial features. In some implementations, the simulating of the change in the focal length includes changing a projection of the face. In some implementations, the method also includes changing head pose information. In some implementations, the method further includes enabling a user to adjust the focal length. In some implementations, the method further includes restricting parametrized face warping to the face and head.

In some implementations, a method includes determining a face model of a face in a photo. The method further includes simulating a change in the focal length based on the face model, where the simulating of the change in the focal length includes parametrized face warping, and where the simulating of the change in the focal length includes changing a projection of the face.

With further regard to the method, in some implementations, the method further includes determining a focal length associated with the face. In some implementations, the face model includes face landmarks. In some implementations, the face model includes a 3-dimensional mesh.

In some implementations, a system includes one or more processors, and logic encoded in one or more tangible media for execution by the one or more processors. When executed, the logic is operable to perform operations including: determining a face model of a face in a photo; and simulating a change in the focal length based on the face model.

With further regard to the system, in some implementations, the face model includes face landmarks. In some implementations, the logic when executed is further operable to perform operations including determining head pose information. In some implementations, to simulate the change in the focal length, the logic when executed is further operable to perform operations including parametrized face warping. In some implementations, to simulate the change in the focal length, the logic when executed is further operable to perform operations including parametrized face warping, and where the parametrized face warping includes changing a size of one or more facial features. In some implementations, to simulate the change in the focal length, the logic when executed is further operable to perform operations including changing a projection of the face. In some implementations, the logic when executed is further operable to perform operations including changing head pose information.

DETAILED DESCRIPTION

Implementations described herein provide focal length adjustments in photos. As described in more detail below, various implementations recognize different aspects of a face in a photograph such as face landmarks and focal length, and then simulates focal length adjustments for the user. In various implementations, a system determines face landmarks of a face in a photo, where each face landmark is associated with floating point coordinates. The system then determines the focal length associated with the face. In some implementations, the system also determines head pose information. The system then simulates a change in the focal length based on the face landmarks. In some implementations, the system simulates the change in the focal length by parametrized face warping, where the system changes the size of one or more facial features by moving one or more of the face landmarks. In some implementations, the system changes the projection of the face by moving one or more of the face landmarks. In some implementations, the system also changes the head pose information.

Figure 1:
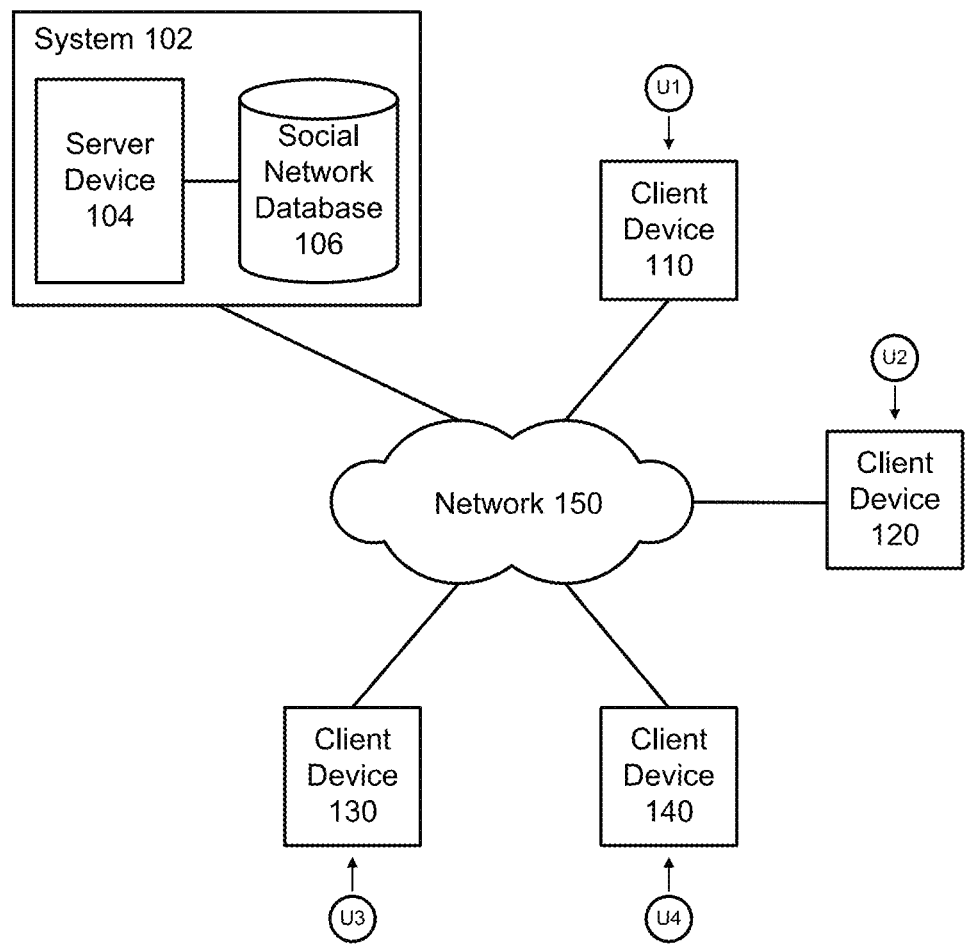
FIG. 1 illustrates a block diagram of an example network environment, which may be used to implement the implementations described herein.

FIG. 1 illustrates a block diagram of an example network environment 100, which may be used to implement the implementations described herein. In some implementations, network environment 100 includes a system 102, which includes a server device 104 and a social network database 106. In various implementations, the term system 102 and phrase "social network system" may be used interchangeably. Network environment 100 also includes client devices 110, 120, 130, and 140, which may communicate with each other via system 102. Network environment 100 also includes a network 150.

For ease of illustration, FIG. 1 shows one block for each of system 102, server device 104, and social network database 106, and shows four blocks for client devices 110, 120, 130, and 140. Blocks 102, 104, and 106 may represent multiple systems, server devices, and social network databases. Also, there may be any number of client devices. In other implementations, network environment 100 may not have all of the components shown and/or may have other elements including other types of elements instead of, or in addition to, those shown herein.

In various implementations, users U1, U2, U3, and U4 may communicate with each other using respective client devices 110, 120, 130, and 140. For example, users U1, U2, U3, and U4 may share media with each other, where respective client devices 110, 120, 130, and 140 transmit media such as photos to each other.

In the various implementations described herein, the processor of system 102 causes the elements described herein (e.g., photos, controls, etc.) to be displayed in a user interface on one or more display screens.

While some implementations are described herein in the context of a social network system, these implementations may apply in contexts other than a social network. For example, implementations may apply locally for an individual user. For example, system 102 may perform the implementations described herein on a stand-alone computer, tablet computer, smartphone, etc.

Figure 2:
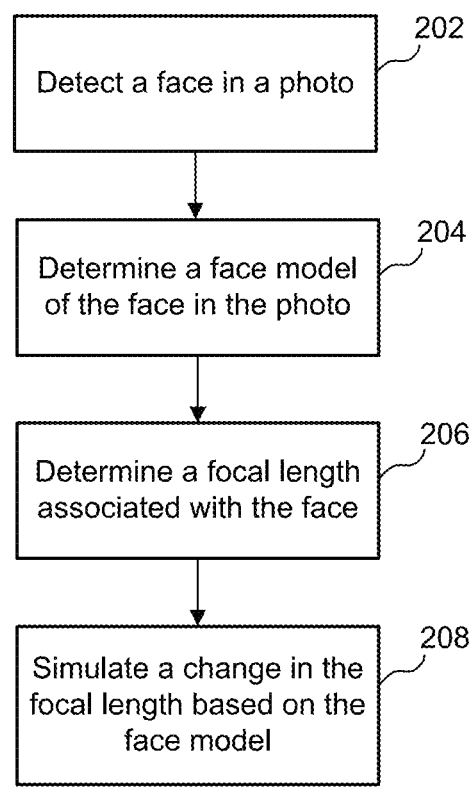
FIG. 2 illustrates an example simplified flow diagram for providing focal length adjustments in photos, according to some implementations.

FIG. 2 illustrates an example simplified flow diagram for providing focal length adjustments in photos, according to some implementations. Referring to both FIGS. 1 and 2, a method is initiated in block 202, where system 102 detects a face in a photo. In various implementations, system 102 may utilize a recognition algorithm to detect and recognize a face in a given one or more photos. Example implementations of recognition algorithms are described in more detail below.

In various implementations, photos may be provided to the system 102 in a number of ways. For example, system 102 may receive the photos when the user uploads the images to system 102 or after the user adds the images to one or more photo albums. In some implementations, system 102 may enable a camera device (e.g., smart phone) of the user to automatically upload images to system 102 as the camera device captures photos.

In block 204, system 102 determines a face model of a face in a photo. In some implementations, the face model may include face landmarks. In some implementations, the face model may include a 3-dimensional (3D) mesh. In various implementations, where the face model includes face landmarks, system 102 may determine a predetermined number of face landmarks for each face, where system 102 associates a set of one or more face landmarks for different regions of the face. In some implementations, such regions may be general portions of the face (e.g., left, right, top, bottom, etc.). In some implementations, such regions may be functional regions (e.g., mouth, nose, eyes, ears, etc.). Example implementations are described in more detail below.

Figure 3:
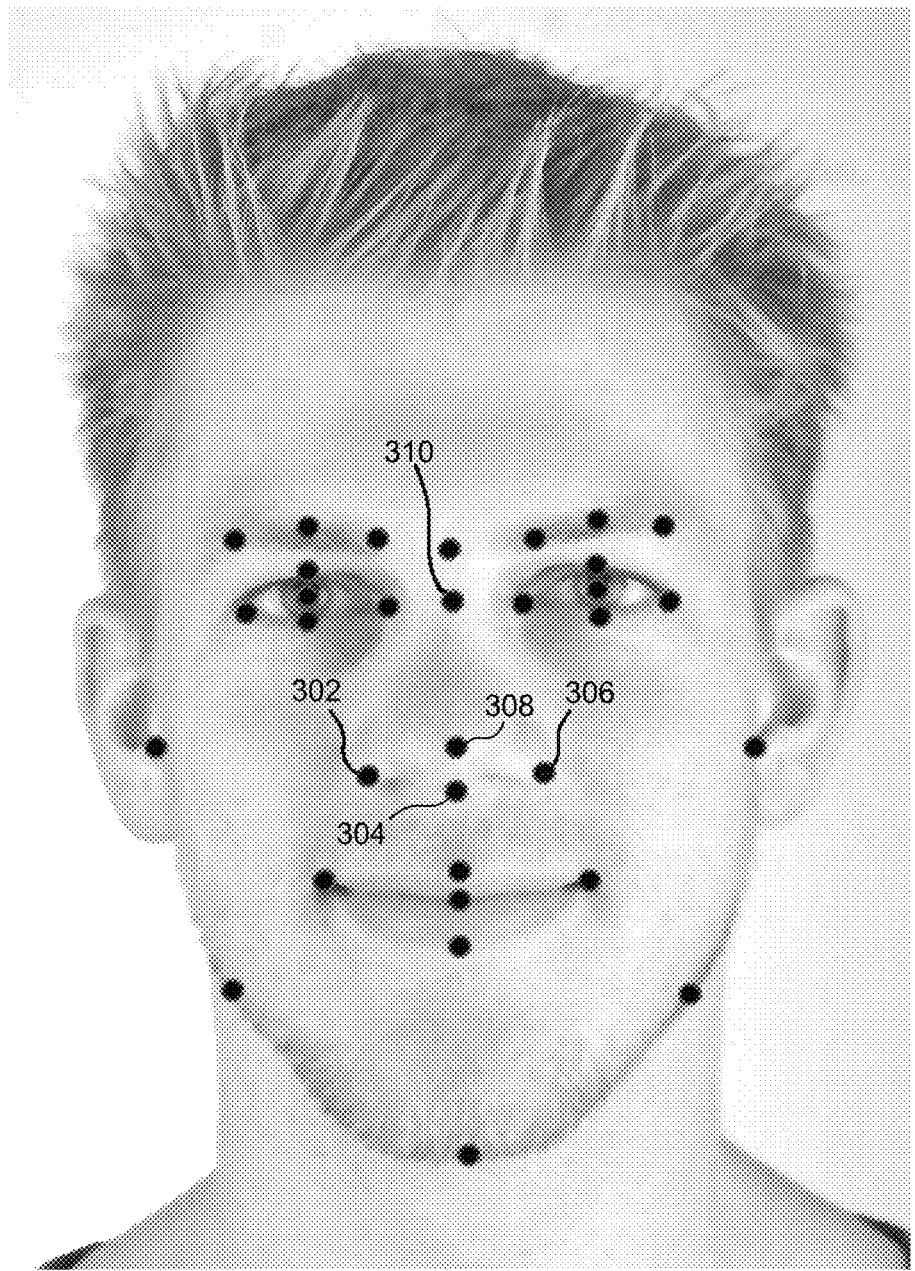
FIG. 3 illustrates an example simplified image of a head and face landmarks, according to some implementations.

FIG. 3 illustrates an example simplified image of a head 300 and face landmarks, according to some implementations. As shown, there are 32 landmarks (indicated by black dots). For example, the nose region has 5 associated face landmarks 302, 304, 306, 308, and 310. For clarity and ease of illustration, only the face landmarks associated with the nose are labeled with reference numbers. As indicated above, all of the face landmarks are indicated by black dots. For example, the other regions of the face also have associated face landmarks. The mouth region has 5 associated face landmarks. Each eye region has 5 associated face landmarks. Each eyebrow region has 3 associated face landmarks. The forehead region has 1 associated face landmark. Each ear region has 1 associated face landmark. The jaw region has 3 associated face landmarks. As described in more detail below, in various implementations, system 102 simulates different focal lengths from 3D face landmark information in a 2D digital image.

While the total number of face landmarks in this particular example is 32, the actual number face landmarks may vary and will depend on the particular implementation. Also, the number of regions and the specific regions having associated face landmarks will depend on the particular implementation.

In various implementations, system 102 may associate each landmark with a landmark identification. In some implementations, system 102 may associate each face landmark with floating point coordinates. In some implementations, system 102 may associate each face landmark with fixed point coordinates. In various implementations, the coordinates may include spatial coordinates and a depth coordinate. In various implementations, system 102 may associate each facial landmark with x, y, z coordinates, where x, y coordinates denote the landmark position in the image plane. For example, the first two coordinates x and y may denote the spatial 2D coordinates of the landmark in image coordinates.

In various implementations, the z coordinate may denote the depth. In various implementations, the depth may be the distance between the camera lens and a particular point on the subject, where the depth is measured along the axis perpendicular to the image plane. In some implementations, system 102 computes transformations in 3D. In some implementations, the z coordinate may be derived from a depth estimate that system 102 carries out on the face using a depth estimation algorithm. The unit of z is compatible with the x, y image coordinates.

In various scenarios, in natural images, human heads and faces may occur in arbitrary positions. For example, a person's head may be facing directly at the camera, away from the camera, etc. A person's head may be tilted up, down, etc. As such, in some implementations, in addition to determining face landmarks, system 102 may also determine head pose information.

In some implementations, pose information may include various angles (e.g., 3 angles) that describe how the head/face is rotated with respect to the image coordinate system. In some implementations, the head pose information may include a pan angle, a roll angle, and a tilt angle. As such, system 102 may determined the pan angle, roll angle, and tilt angle.

Referring again to FIG. 2, in block 206, system 102 determines a focal length associated with the face. Note that system 102 determining the focal length associated with the face is optional in that system 102 may apply a correction that simulates a change in focal length (in block 208 below) without actually explicitly determining the original focal length. In various implementations, system 102 determines the focal length based on depth information (e.g., the distance between the subject and the camera lens). In various implementations, system 102 may utilize any suitable hardware, software, or combination thereof to retrieve depth information of the scene in blocks 202, 204, and 206. For example, system 102 may utilize a time-of-flight camera coupled to a conventional camera (e.g., the camera of a phone, etc.). In some implementations, system 102 may use a time-of-flight camera to determine z coordinates of face landmarks. In another example, system 102 may also use a time-of-flight camera to resolve distance between the camera and the subject for each point of the image. While some of these implementations are described in the context of a time-of-flight camera, system 102 may alternatively utilize any range imaging camera system that resolves distance between the camera and the subject for each point of the image.

In various implementations, system 102 may resolve distance between the camera and the subject for each point of the image in a number of ways. For example, in some implementations, system 102 may infer per-pixel depth values from 2D image pixels by different means such as, for example, the following: In some implementations, system 102 may compute depth from defocus. In some implementations, system 102 may compute depth from shading. In some implementations, system 102 may use other objects than faces to get depth cues. Such objects may include cars, houses, etc., for example.

In various scenarios, to accurately change the focal length in a 2D image, system 102 may determine an additional depth value at each pixel. While such depth information might not always be available, the presence of known objects in the image provides depth cues. Sometimes, the objects are well known, such as human faces.

In block 208, system 102 simulates a change in the focal length based on the face landmarks. In various implementations, with a priori knowledge of an optimal focal length, system 102 may automatically change the focal length to produce a desirable face. Example implementations of simulating a change in focal length are described in more detail below.

In some implementations, to simulate the change in the focal length, system 102 changes the projection of the face. For example, system 102 may change the projection of the face by moving the facial landmarks to different positions.

In some implementations, to change the projection of the face, system 102 moves one or more of the face landmarks, wherein x, y, and z positions are changed. For example, as a person's face moves closer to the camera, the person's nose becomes more dominant (e.g., appears bigger) and the person's ears become less dominant. As the person's face moves away from the camera, the sizes of the features of the person's face (e.g., nose and ears) become more balanced. The field of view does not change. In some implementations, system 102 may change the projection of the face by changing the size of one or more facial features (e.g., eyes, nose, mouth, etc.). Example implementations of changing the size of facial features are described in more detail below. In some implementations, to simulate the change in the focal length, system 102 normalizes the face, changes a projection of the face, and then undoes the normalizing.

In some implementations, the simulating of the change in the focal length includes parametrized face warping. For example, after changing the projection of the face by moving one or more face landmarks, system 102 may warp the original image such that the warped result resembles a different focal length. In some implementations, system 102 restricts the parametrized face warping to the face and head. In other words, system 102 may ignore the background.

In various implementations, system 102 performs the face warping in 2 dimensions only. For example, system 102 may perform face warping by moving one or more of the face landmarks, where only x and y positions are changed. In other words, the z coordinate is not used. In some implementations, the parametrized the face warping entails finding a function that produces 2*32 numbers from 3*32 numbers, where the 2 represents 2 dimensions and the 3 represents 3 dimensions, and the 32 represents the maximum number face landmarks (in this particluar example). As noted above, the actual number of face landmarks will depend on the particular implementation.

In some implementations, to simulate the change in the focal length, system 102 performs parametrized face warping in that system 102 changes the size of one or more facial features. System 102 changes the size of one or more facial features based on one or more of the face landmarks. For example, system 102 changes the size of a particular facial feature by moving one or more face landmarks. In some implementations, system 102 performs face warping by moving one or more of the face landmarks, where only x and y positions are changed.

In various implementations, decreasing the size of a given facial feature, such as the nose, may simulate increasing the focal length. Increasing the size of a given facial feature, such as the nose, may simulate decreasing the focal length. For example, system 102 may decrease the size of a given facial feature such as the nose by moving the face landmarks 302, 304, 306, 308 closer to each other. In contrast, system 102 may increase the size of a given facial feature such as the nose by moving the face landmarks 302, 304, 306, 308 away from each other.

In various implementations, system 102 may process the other facial features (e.g., the eyes, ears, mouth, etc.) in a similar manner. That is, system 102 may move a cluster of face landmarks closer to each other to decrease the size of the facial feature. System 102 may move a cluster of face landmarks away from each other to increase the size of the facial feature.

In some implementations, system 102 may change head pose information. In some implementations, system 102 may process one or more face landmarks as follows. System 102 may center all or some of the face landmarks at a common origin. System 102 may then correct the head pose by applying an orthogonal 3×3 matrix. System 102 may then apply a user-defined pose matrix. In some implementations, the user-defined pose matrix may also be an orthogonal 3×3 matrix. System 102 may then redo or adjust the head pose. System 102 may then move the face landmarks back to the old center. Note that in various implementations, system 102 may include all of these steps, or may omit one or more of these steps.

In some implementations, system 102 may apply a user-defined pose matrix based on the following matrix-vector multiplication equation $(x_t, y_t, z_t)^T = P(x, y, z)^T$, where $(x, y, z)$ are the original coordinates of the face landmark, P is the orthogonal 3×3 matrix, which is in one-to-one correspondence with three scalar/head pose angles, and $(x_t, y_t, z_t)$ are the new landmark coordinates. In various implementations, the $z_t$ coordinate may not be required, and is discarded for the actual warping.

In some implementations, system 102 enables a user to adjust the focal length. For example, in some implementations, system 102 provides a slider to enable the user to move the slider to adjust the focal length. In some implementations, the change is derived from 2D image pixels. In some implementations, the slider is directly related to focal length (e.g., with a scale of 18-300 mm. etc.). In some implementations, the slider scale is nonlinear, as the "rate of the change" diminishes at higher focal lengths.

In some implementations, system 102 may perform face warping based on interpolation using thin-plate splines. For example, after finding new locations for one or more landmarks, system 102 performs actual face warping. In various implementations, to perform the face warping, system 102 produces a new image (e.g., of the face) from the original image, such that in the new image, the face landmarks are at the prescribed positions. Also, system 102 interpolates all of the pixels in between in a smooth fashion. To perform the interpolation, system 102 may, for example, use thin-plate splines or another interpolation technique.

In some implementations, given two sets of N points with their original positions $(x_1, y_1), \ldots, (x_N, y_N)$ in a 2D image, as well as their desired positions $(xn_1, yn_1), \ldots, (xn_N, yn_N)$, the thin-plate spline method delivers an interpolating function $f$ which maps $(x_i, y_i)$ to $(xn_i, yn_i)$ for $i=1, \ldots N$ and interpolates everything in between smoothly. In some implementations, $f$ can be obtained by inverting an $(N+d+1) \times (N+d+1)$-dimensional matrix, where $d=2$ or $d=3$ is the dimension.

Implementations described herein provide various benefits. For example, implementations remove unwanted facial distortions caused by subjects (e.g., people, faces, etc.) that are close to a camera with a short focal length (e.g., most phone cameras, etc.).

Although the steps, operations, or computations may be presented in a specific order, the order may be changed in particular implementations. Other orderings of the steps are possible, depending on the particular implementation. In some particular implementations, multiple steps shown as sequential in this specification may be performed at the same time. Also, some implementations may not have all of the steps shown and/or may have other steps instead of, or in addition to, those shown herein.

While system 102 is described as performing the steps as described in the implementations herein, any suitable component or combination of components of system 102 or any suitable processor or processors associated with system 102 may perform the steps described.

In various implementations, system 102 may utilize a variety of recognition algorithms to recognize faces, landmarks, objects, etc. in images. Such recognition algorithms may be integral to system 102. System 102 may also access recognition algorithms provided by software that is external to system 102 and that system 102 accesses.

In various implementations, system 102 enables users of the social network system to specify and/or consent to the use of personal information, which may include system 102 using their faces in images or using their identity information in recognizing people identified in images. For example, system 102 may provide users with multiple selections directed to specifying and/or consenting to the use of personal information. For example, selections with regard to specifying and/or consenting may be associated with individual images, all images, individual photo albums, all photo albums, etc. The selections may be implemented in a variety of ways. For example, system 102 may cause buttons or check boxes to be displayed next to various selections. In some implementations, system 102 enables users of the social network to specify and/or consent to the use of using their images for facial recognition in general. Example implementations for recognizing faces and other objects are described in more detail below.

In situations in which the systems discussed here collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

In various implementations, system 102 obtains reference images of users of the social network system, where each reference image includes an image of a face that is associated with a known user. The user is known, in that system 102 has the user's identity information such as the user's name and other profile information. In some implementations, a reference image may be, for example, a profile image that the user has uploaded. In some implementations, a reference image may be based on a composite of a group of reference images.

In some implementations, to recognize a face in an image, system 102 may compare the face (e.g., image of the face) and match the face to reference images of users of the social network system. Note that the term "face" and the phrase "image of the face" are used interchangeably. For ease of illustration, the recognition of one face is described in some of the example implementations described herein. These implementations may also apply to each face of multiple faces to be recognized. The availability of one or more reference images and facial feature data associated with the reference images may have the technical effect that the image of the face is a known object, which may provide depth cues for the image of the face and thus support and improve determining a focal length associated with the face.

In some implementations, system 102 may search reference images in order to identify any one or more reference images that are similar to the face in the image. In some implementations, for a given reference image, system 102 may extract features from the image of the face in an image for analysis, and then compare those features to those of one or more reference images. For example, system 102 may analyze the relative position, size, and/or shape of facial features such as eyes, nose, cheekbones, mouth, jaw, etc. In some implementations, system 102 may use data gathered from the analysis to match the face in the image to one more reference images with matching or similar features. In some implementations, system 102 may normalize multiple reference images, and compress face data from those images into a composite representation having information (e.g., facial feature data), and then compare the face in the image to the composite representation for facial recognition.

In some scenarios, the face in the image may be similar to multiple reference images associated with the same user. As such, there would be a high probability that the person associated with the face in the image is the same person associated with the reference images.

In some scenarios, the face in the image may be similar to multiple reference images associated with different users. As such, there would be a moderately high yet decreased probability that the person in the image matches any given person associated with the reference images. To handle such a situation, system 102 may use various types of facial recognition algorithms to narrow the possibilities, ideally down to one best candidate.

For example, in some implementations, to facilitate in facial recognition, system 102 may use geometric facial recognition algorithms, which are based on feature discrimination. System 102 may also use photometric algorithms, which are based on a statistical approach that distills a facial feature into values for comparison. A combination of the geometric and photometric approaches could also be used when comparing the face in the image to one or more references.

Other facial recognition algorithms may be used. For example, system 102 may use facial recognition algorithms that use one or more of principal component analysis, linear discriminate analysis, elastic bunch graph matching, hidden Markov models, and dynamic link matching. It will be appreciated that system 102 may use other known or later developed facial recognition algorithms, techniques, and/or systems.

In some implementations, system 102 may generate an output indicating a likelihood (or probability) that the face in the image matches a given reference image. In some implementations, the output may be represented as a metric (or numerical value) such as a percentage associated with the confidence that the face in the image matches a given reference image. For example, a value of 1.0 may represent 100% confidence of a match. This could occur, for example, when compared images are identical or nearly identical. The value could be lower, for example 0.5 when there is a 50% chance of a match. Other types of outputs are possible. For example, in some implementations, the output may be a confidence score for matching.

Figure 4:
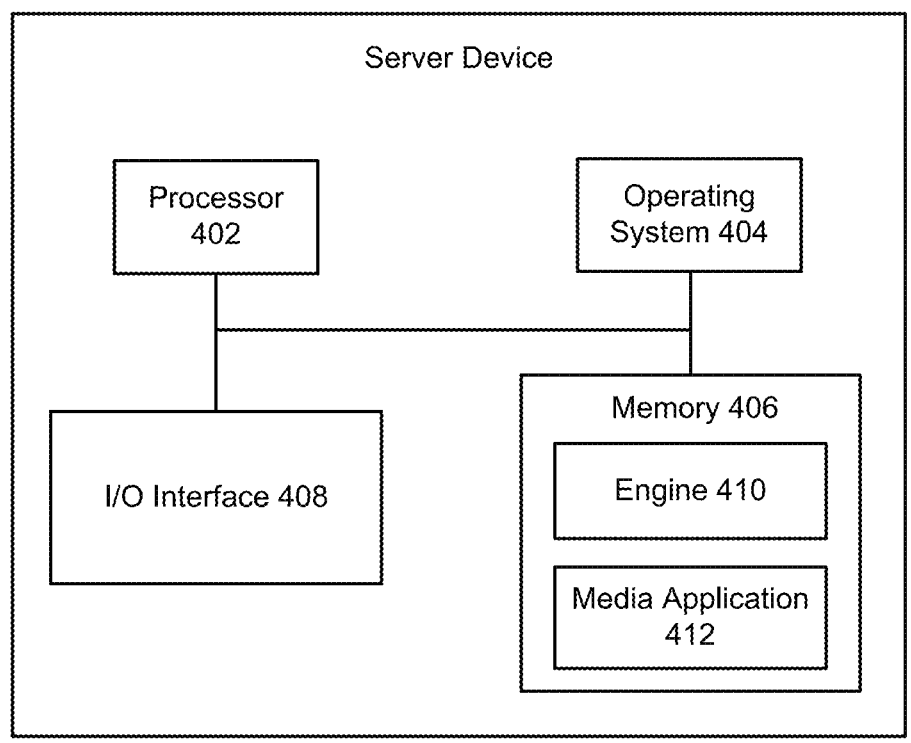
FIG. 4 illustrates a block diagram of an example server device, which may be used to implement the implementations described herein.

FIG. 4 illustrates a block diagram of an example server device 400, which may be used to implement the implementations described herein. For example, server device 400 may be used to implement server device 104 of FIG. 1, as well as to perform the method implementations described herein. In some implementations, server device 400 includes a processor 402, an operating system 404, a memory 406, and an input/output (I/O) interface 408. Server device 400 also includes a social network engine 410 and a media application 412, which may be stored in memory 406 or on any other suitable storage location or computer-readable medium. Media application 412 provides instructions that enable processor 402 to perform the functions described herein and other functions.

For ease of illustration, FIG. 4 shows one block for each of processor 402, operating system 404, memory 406, I/O interface 408, social network engine 410, and media application 412. These blocks 402, 404, 406, 408, 410, and 412 may represent multiple processors, operating systems, memories, I/O interfaces, social network engines, and media applications. In other implementations, server device 400 may not have all of the components shown and/or may have other elements including other types of elements instead of, or in addition to, those shown herein.

Although the description has been described with respect to particular embodiments thereof, these particular embodiments are merely illustrative, and not restrictive. Concepts illustrated in the examples may be applied to other examples and implementations. For example, some implementations are described herein in the context of a social network system. However, the implementations described herein may apply in contexts other than a social network. For example, implementations may apply locally for an individual user.

Note that the functional blocks, methods, devices, and systems described in the present disclosure may be integrated or divided into different combinations of systems, devices, and functional blocks as would be known to those skilled in the art.

Any suitable programming languages and programming techniques may be used to implement the routines of particular embodiments. Different programming techniques may be employed such as procedural or object-oriented. The routines may execute on a single processing device or multiple processors. Although the steps, operations, or computations may be presented in a specific order, the order may be changed in different particular embodiments. In some particular embodiments, multiple steps shown as sequential in this specification may be performed at the same time.

A "processor" includes any suitable hardware and/or software system, mechanism or component that processes data, signals or other information. A processor may include a system with a general-purpose central processing unit, multiple processing units, dedicated circuitry for achieving functionality, or other systems. Processing need not be limited to a geographic location, or have temporal limitations. For example, a processor may perform its functions in "real-time," "offline," in a "batch mode," etc. Portions of processing may be performed at different times and at different locations, by different (or the same) processing systems. A computer may be any processor in communication with a memory. The memory may be any suitable data storage, memory and/or non-transitory computer-readable storage medium, including electronic storage devices such as random-access memory (RAM), read-only memory (ROM), magnetic storage device (hard disk drive or the like), flash, optical storage device (CD, DVD or the like), magnetic or optical disk, or other tangible media suitable for storing instructions for execution by the processor. The software instructions can also be contained in, and provided as, an electronic signal, for example in the form of software as a service (SaaS) delivered from a server (e.g., a distributed system and/or a cloud computing system).

What is claimed is:

1. A computer-implemented method comprising:
   determining a face model of a face in a photo;
   determining a focal length associated with the face based on depth information, wherein the depth information is based on depth cues provided by matching the face with one or more reference images associated with a known user of a social network system to determine that the face in the photo is a known object;
   providing a slider to a user via a user interface to adjust the focal length;
   receiving user input that indicates a movement of the slider;
   simulating a change in the focal length based on the face model and the user input to produce a new photo, wherein simulating the change in the focal length comprises normalizing the face, adjusting a size of a facial feature after the normalizing, and undoing the normalizing after adjusting the size of the facial feature, wherein adjusting the size of the facial feature comprises at least one of:
   moving face landmarks corresponding to the facial feature closer to each other to decrease the size of the facial feature corresponding to increase in the focal length; and
   moving the face landmarks corresponding to the facial feature away from each other to increase the size of the facial feature corresponding to decrease in the focal length; and
   causing the new photo to be displayed in the user interface.

2. The method of claim 1, wherein the face model comprises the face landmarks, wherein each face landmark is associated with one or more floating point coordinates.

3. The method of claim 2, further comprising determining head pose information.

4. The method of claim 2, further comprising wherein the one or more floating point coordinates include spatial coordinates and depth coordinates.

5. The method of claim 1, wherein the simulating of the change in the focal length further comprises parametrized face warping.

6. The method of claim 5, further comprising restricting the parametrized face warping to the face and head.

7. The method of claim 1, wherein the simulating of the change in the focal length further comprises changing a projection of the face.

8. The method of claim 1, wherein a rate of change of the focal length is one of: directly related to the movement of the slider or bears a non-linear relationship to the movement of the slider.

9. The computer-implemented method of claim 1, further comprising computing the depth information from at least one of defocus and shading.

10. A computer-implemented method comprising:
determining a face model of a face in a photo;
determining a focal length associated with the face based on depth information, wherein the depth information is based on depth cues provided by matching the face with one or more reference images by extracting features from the face in the photo and comparing the features with features of the one or more reference images to determine that the extracted features match the features of the one or more reference images;
providing a control that is displayed via a user interface, the control effective to adjust the focal length;
receiving user input via the control;
simulating a change in the focal length based on the face model and the user input to produce a new photo, wherein the simulating of the change in the focal length includes:
normalizing the face,
after normalizing the face, performing parametrized face warping, changing a projection of the face, and adjusting a size of a facial feature, and
undoing the normalizing, wherein adjusting the size of the facial feature comprises at least one of:
moving face landmarks corresponding to the facial feature closer to each other to decrease the size of the facial feature corresponding to increase in the focal length; and
moving face landmarks corresponding to the facial feature away from each other to increase the size of the facial feature corresponding to decrease in the focal length; and
causing the new photo to be displayed in the user interface.

11. The method of claim 10, wherein simulating the change in the focal length further comprises face warping based on interpolation using thin-plate splines.

12. The computer-implemented method of claim 10, further comprising computing the depth information from at least one of defocus and shading.

13. A system comprising:
one or more processors; and
logic encoded in one or more tangible media for execution by the one or more processors and when executed operable to perform operations comprising:
determining a face model of a face in a photo, wherein the face model includes one or more face landmarks;
computing depth information, wherein the depth information is based on depth cues provided by matching the face with one or more reference images of a known user to determine that the face has features that match features of the one or more reference images;
determining a focal length associated with the face based on the depth information;
simulating a change in the focal length based on the face model to produce a new photo, wherein the simulating includes normalizing the face, changing a projection of the face by moving one or more of the face landmarks to different positions to adjust a size of a facial feature after the normalizing, and undoing the normalizing after changing the projection of the face, wherein the moving comprises at least one of:
moving face landmarks corresponding to the facial feature closer to each other to decrease the size of the facial feature corresponding to increase in the focal length; and
moving the face landmarks corresponding to the facial feature away from each other to increase the size of the facial feature corresponding to decrease in the focal length; and
causing the new photo to be displayed.

14. The system of claim 13, wherein the logic when executed is further operable to perform operations comprising determining head pose information.

15. The system of claim 13, wherein, to simulate the change in the focal length, the logic when executed is further operable to perform operations comprising parametrized face warping.

16. The system of claim 13, wherein the operation of simulating the change further comprises normalizing the face.

17. The system of claim 13, wherein the logic when executed is further operable to perform operations comprising changing head pose information.

18. The system of claim 13, wherein simulating the change in the focal length further comprises processing one or more face landmarks by at least one of:
applying an orthogonal matrix;
applying a user-defined pose matrix; and
adjusting a head pose.

* * * * *